（12） United States Patent
Adkins et al.

(10) Patent No.: US 6,768,427 B1
(45) Date of Patent: Jul. 27, 2004

(54) ENCODER INITIALIZATION METHODS AND RELATED SYSTEMS

(75) Inventors: Christopher A. Adkins, Lexington, KY (US); Michael A. Marra, III, Lexington, KY (US); Jay W. Vessels, Lexington, KY (US); John T. Writt, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/396,561

(22) Filed: Mar. 25, 2003

(51) Int. Cl.[7] ............................................... H03M 1/22
(52) U.S. Cl. ........................................ 341/13; 341/16
(58) Field of Search ............................ 341/13, 16, 118, 341/120, 155; 250/233, 231.16, 205, 214, 233.16, 204; 347/248, 250, 214 R, 206.1, 234, 235

(56) References Cited

U.S. PATENT DOCUMENTS

| | | | |
|---|---|---|---|
| 3,680,964 A | * | 8/1972 | Granqvist .............. 250/231.16 |
| 4,074,128 A | | 2/1978 | Harris, Jr. et al. |
| 4,293,814 A | | 10/1981 | Boyer |
| 4,448,368 A | | 5/1984 | Skalko |
| 4,460,968 A | | 7/1984 | Cavill et al. |
| 4,687,994 A | | 8/1987 | Fulkerson et al. |
| 4,700,063 A | | 10/1987 | Hara |
| 4,803,354 A | * | 2/1989 | Onodera et al. ....... 250/231.16 |
| 4,866,268 A | | 9/1989 | Tang et al. |
| 4,873,655 A | | 10/1989 | Kondraske |
| 5,066,953 A | * | 11/1991 | Lengenfelder et al. ...... 341/155 |
| 5,120,954 A | | 6/1992 | Taniguchi |
| 5,166,510 A | * | 11/1992 | Matsubara et al. ......... 250/205 |
| 5,285,293 A | | 2/1994 | Webb et al. |
| 5,302,944 A | | 4/1994 | Curtis |
| 5,471,054 A | | 11/1995 | Watanabe |
| 5,532,583 A | | 7/1996 | Davis et al. |
| 5,644,127 A | * | 7/1997 | Ohmae ................. 250/231.16 |
| 5,650,719 A | | 7/1997 | Moody et al. |
| 5,694,038 A | | 12/1997 | Moody et al. |
| 5,712,560 A | | 1/1998 | Maeda et al. |
| 5,736,852 A | | 4/1998 | Pattantyus |
| 5,757,181 A | | 5/1998 | Wolf et al. |
| 5,796,414 A | | 8/1998 | Sievert et al. |
| 5,847,658 A | * | 12/1998 | Irie et al. .................. 340/683 |
| 6,198,275 B1 | | 3/2001 | Wolf et al. |
| 6,285,958 B1 | | 9/2001 | Wolf et al. |
| 6,304,825 B1 | * | 10/2001 | Nowak et al. ................ 702/94 |
| 6,445,178 B1 | | 9/2002 | Hoekstra |
| 6,452,512 B1 | * | 9/2002 | Adkins et al. ................ 341/13 |
| 6,639,620 B2 | * | 10/2003 | Ishikawa et al. ............ 347/235 |

FOREIGN PATENT DOCUMENTS

| | | |
|---|---|---|
| JP | 60140118 | 3/1985 |
| WO | WO 00/25167 | 5/2000 |

* cited by examiner

*Primary Examiner*—Michael Tokar
*Assistant Examiner*—Linh Van Nguyen
(74) *Attorney, Agent, or Firm*—Thompson Hine LLP

(57) ABSTRACT

In one aspect, in a device such as a printer, an encoder system method initializes the system to produce analog output signals that fall outside the detection range of an A/D converter of the system. In another aspect, in a device such as a printer, an encoder system method initializes the system without converting analog signal levels into corresponding digital values.

54 Claims, 9 Drawing Sheets

ENCODER INITIALIZATION METHODS AND RELATED SYSTEMS

TECHNICAL FIELD

The present invention relates generally to encoders, and more particularly, to both analog and digital encoder systems and methods for initializing such systems.

BACKGROUND OF THE INVENTION

The cost of analog encoders increases as the encoder components such as the encoder mask, light element and photo sensors are made more precise and/or with higher tolerances. When working with less expensive encoders the encoder output signals produced have a tendency to be further removed from ideal signals.

U.S. Pat. No. 6,452,512 describes a desirable encoder system having an A/D converter, and a related initialization process in which adjustments to an encoder light element energization level are made, along with adjustments to a dc offset of the signal, in order to produce suitable encoder signals that are within a detection range of the A/D converter.

In one aspect, it would be advantageous to provide an encoder initialization method which can be used to achieve desired encoder signals that are saturated beyond the detection range of an A/D converted or other analog signal detector.

In another aspect, it would be desirable to provide an encoder system and related initialization method that does not require the analog signal levels of an encoder signal to be converted into corresponding digital values, thus saving the cost of an A/D converter.

SUMMARY OF THE INVENTION

In one aspect, a method is provided for initializing an encoder system that provides a varying analog output signal to an analog signal detector having a detection range defined by a maximum and a minimum, the encoder system including at least one component that can be controlled to vary at least a peak to peak amplitude of the analog output signal. The method involves the steps of: (a) measuring an output of the analog signal detector while the component is at a first setting; (b) measuring the output of the analog signal detector while the component is at a second setting; and (c) based at least in part upon measurements made in steps (a) and (b), defining an operating setting for the component so as to place an upper envelope of the analog output signal above the maximum of the detection range and a lower envelope of the analog output signal below the minimum of the detection range when the encoder operates with the component at the operating setting.

In another aspect, a method is provided for initializing an encoder system that includes a movable element and produces at least first and second varying analog output signals in response to movement of the movable element, the encoder system including at least one output affecting component that can be adjusted. The method involves the steps of: (a) inputting the first and second analog output signals to an analog to digital converter having a detection range defined by a maximum and a minimum; (b) for each of the first and second analog output signals, measuring a corresponding output of the analog to digital converter while the movable encoder element is moving and the output affecting component is set at at least one known setting; and (c) based at least in part upon the measuring done in step (b), defining an operating setting for the output affecting component so as to place an upper envelope of each of the first and second analog output signals above the maximum of the detection range and the lower envelope of each of the first and second analog output signals below the minimum of the detection range.

In a further aspect, a printer includes the encoder system of the preceding paragraph, and a control unit that carries out the method steps of the preceding paragraph.

In yet another aspect, a method is provided for initializing an encoder system that produces an analog output signal on an output channel, without converting analog signal levels of the analog output signal into corresponding digital values, the system including a light element with an adjustable energization level and the output channel including a photo sensor producing a signal as a function of light received and dc offset circuitry for offsetting the signal to produce the analog output signal. The method involves the steps of: (a) inputting the analog output signal to at least one level detector that detects when the analog output signal increases to an upper threshold level and when the analog output signal decreases to a lower threshold level; (b) while the energization level of the light element is set at a first energization level, adjusting the setting of the dc offset circuitry and monitoring for changes in output of the level detector to identify a first offset setting corresponding to the upper threshold level and a second offset setting corresponding to the lower threshold setting; (c) while the energization level of the light element is set at a second energization level, adjusting the setting of the dc offset circuitry and monitoring for changes in output of the level detector to identify a third offset setting corresponding to the upper threshold level and a fourth offset setting corresponding to the lower threshold setting; and (d) based at least in part upon the first, second, third and fourth offset settings identified in steps (b) and (c), establishing an operating energization level for the light element and an operating offset setting for the dc offset circuitry.

In still a further aspect, a method is provided for initializing an encoder system that produces an analog output signal on an output channel, without converting analog signal levels of the analog output signal into corresponding digital values, the system including a light element with an adjustable energization level and the output channel including a photo sensor producing a signal as a function of light received and dc offset circuitry for offsetting the signal to produce the analog output signal. The method involves the steps of: (a) inputting the analog output signal to at least one level detector that detects when the analog output signal increases to an upper threshold level and detects when the analog output signal decreases to a lower threshold level; (b) adjusting the setting of the dc offset circuitry and monitoring for changes in output of the level detector to identify offset settings corresponding to the upper threshold level and the lower threshold level; and (c) based at least in part upon the offset settings identified in step (b), establishing an operating energization level for the light element and an operating offset setting for the dc offset circuitry.

In another aspect, a printer includes an encoder system with a movable element connected for movement with a printer structure, the encoder system including at least one light element and at least first and second output channels, the first output channel producing an analog output signal that varies according to light received by a first photo sensor and the second output channel producing an analog output signal that varies as a function of light received by a second photo sensor. Movement of the movable element varies light received by the first and second photo sensors. A signal detection system includes a first Schmitt trigger connected to receive the analog output signal of the first output channel and having a first upper detection threshold and a first lower detection threshold, with first latching circuitry connected to an output of the first Schmitt trigger for producing (i) a latched output corresponding to the analog output signal of the first output channel reaching the first upper detection threshold and (ii) a latched output corresponding to the analog output signal of the first output channel reaching the first lower detection threshold. The signal detection system further includes a second Schmitt trigger connected to receive the analog output signal of the second output channel and having a second upper detection threshold and a second lower detection threshold, with second latching circuitry connected to an output of the second Schmitt trigger for producing (i) a latched output corresponding to the analog output signal of the second output channel reaching the second upper detection threshold and (ii) a latched output corresponding to the analog output signal of the second output channel reaching the second lower detection threshold.

In a further aspect, a printer includes one of a print head carriage and a paper feed roller connected with an encoder system that produces a varying analog output signal corresponding to movement of the one of the carnage and roller, the encoder system including at least one that can be controlled to vary the analog output signal and a control unit operable to initialize the encoder system to achieve a suitable encoder output signal for use in monitoring movement of the one of the carriage and the roller. A method of triggering an initialization process in the printer involves the steps of: detecting an ambient temperature condition of the printer; and triggering the initialization process if the ambient temperature condition satisfies a certain parameter.

DETAILED DESCRIPTION

Figure 1:
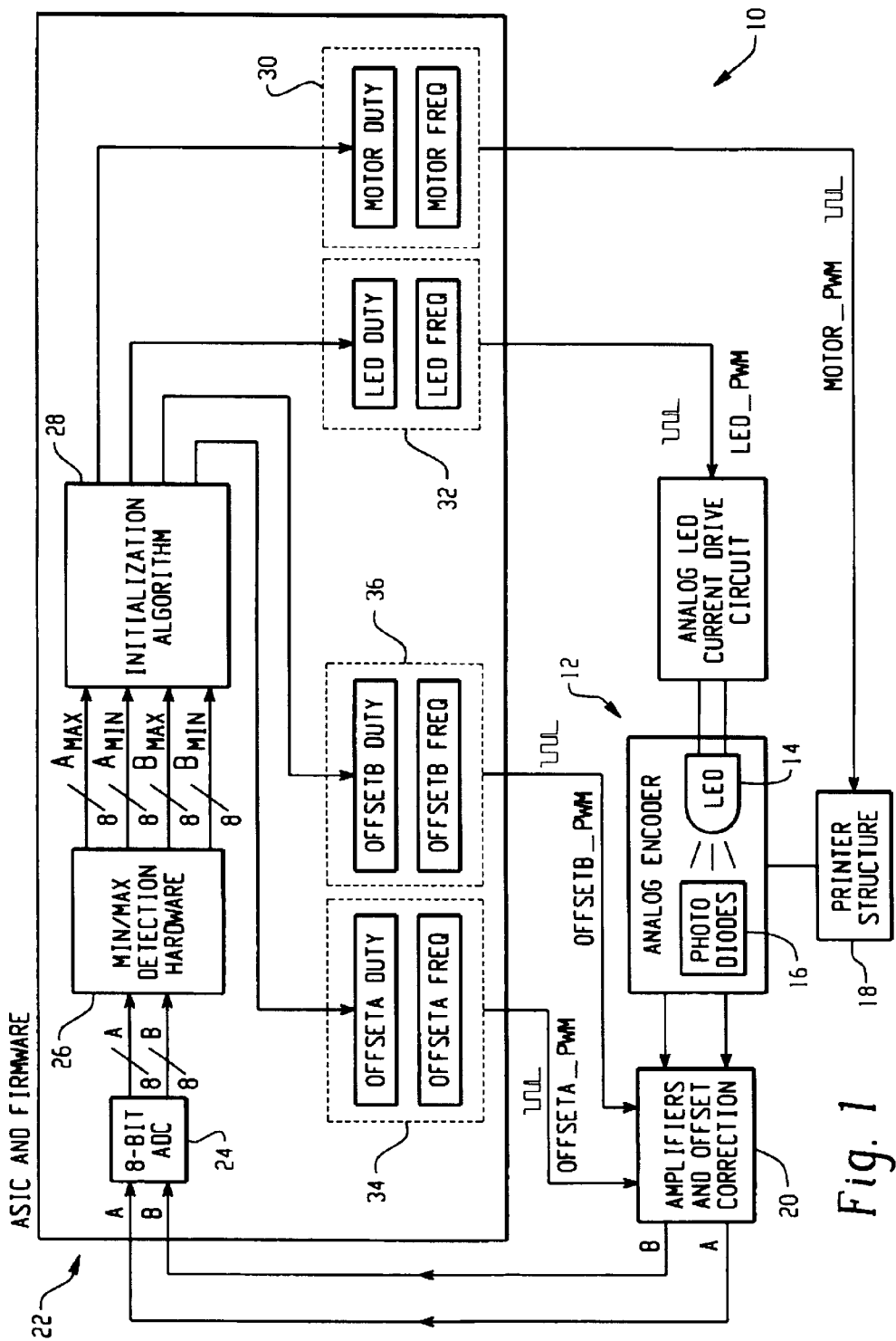
FIG. 1 is a schematic of one embodiment of an encoder system of a printer.

Referring to FIG. 1, a schematic of an encoder system 10 is illustrated and includes an analog encoder 12 having a light element 14 such as an LED and photo sensors 16 which may take the form of photo diodes. In the case of a rotary encoder a rotating, windowed mask may be positioned between the light element 14 and photo sensors 16. In the case of a linear encoder the light element 14 and photo sensors 16 may move relative to a fixed, windowed encoder mask strip. A structure 18 such as a rotating printer feed roller or a reciprocating print head carriage mounted for movement across a paper path is associated with the encoder 12 as is commonly known in the art. The encoder 12 includes amplification and offset circuitry 20 for each of the A and B channels that acts on the output of the photo sensors 16 to produce the analog A and B output signals of the encoder, which are provided to a controller 22. In the illustrated embodiment the controller 22 is formed by an ASIC in combination with firmware or other code. An A/D converter 24 receives the analog A and B signals of the encoder 12. The A/D converter 24 outputs digital values corresponding to analog levels of the A and B signals to a min/max detection circuit 26. The min/max detection circuit 26 outputs minimum and maximum values ($A_{MAX}$, $A_{MIN}$, $B_{MAX}$, $B_{MIN}$) for each of the A and B signals for analysis or examination by an initialization module 28 which may be formed by firmware code. The initialization module is associated with a motor control PWM module 30, an encoder energization PWM module 32, an A channel offset PWM module 34 and a B channel offset PWM module 36. In each case the initialization module 28 can adjust a duty cycle that the particular PWM module uses to produce its output PWM signal. The PWM signal MOTOR_PWM output by the motor control PWM module 30 is provided to control the movement of a motor associated with the printer structure 18. The PWM signal LED_PWM output by the encoder energization PWM module 32 is provided to a current drive circuit 38 for controlling the energization level of the encoder light element 14. The PWM signal OFFSETA_PWM output by the offsetA PWM module 34 controls the dc offset applied to the signal output by the photo sensor associated with the A channel of the encoder 12. Similarly, PWM signal OFFSETB_PWM output by the offsetB PWM module 36 controls the dc offset applied to the signal output by the photo sensor associated with the B channel of the encoder 12.

As used herein the term "printer" is intended to encompass any device which is capable of placing indicia on a media, regardless of the type of print technology and printer mechanism used. Further, the term "printer" specifically encompasses both stand alone units and multi-function devices incorporating the capability of placing indicia on a media (e.g., devices commonly referred to as combination fax/printers).

Generally it is desirable that the A and B analog encoder signals of an encoder system such as that of FIG. 1 be produced with the same amplitude and in the same range. However, variances between electrical components and mechanical imperfections tend to cause the signals produced by the photo sensors 16 to differ in amplitude and range. In the encoder system 10 two primary parameters can be adjusted in attempt to control the A and B encoder signals produced, namely the energization level of the light element as set by the LED_PWM signal and the dc offset of the A and B channels as set by the OFFSETA_PWM and OFFSETB_PWM signals respectively. Adjusting light source energization tends to primarily vary the amplitude of the encoder signals produced while adjusting the dc offsets tends to primarily vary the range within which the encoder signals are produced, and that range is considered as being defined by an upper envelope and a lower envelope, where the upper envelope is tracks the maximum value of an encoder signal and the lower envelope is tracks the minimum value of the encoder signal.

The A/D converter 24 has a limited detection range defined by a maximum and a minimum. In one example, the A/D converter is an 8 bit converter with a detection range having a minimum of zero volts and a maximum of 3.5 volts. In such a case, the A/D converter outputs a digital value of zero ("00000000") for any analog input voltage that is at or below zero volts. Likewise, the A/D converter 24 outputs a digital value of 255 ("11111111") for any analog input voltage that is at or above 3.5 volts. It has been determined that, in actual operation, robust performance of the encoder system can be achieved over a large range of speeds and environments by utilizing encoder signals that actually extend outside the detection range of the A/D converter, meaning an upper envelope of each encoder signal is at an amplitude above the maximum of the detection range and a lower envelope of each encoder signal is below the minimum of the detection range. The following procedure allows the encoder system to be initialized in a simple, effective manner to achieve such an encoder signal arrangement.

Figure 2:
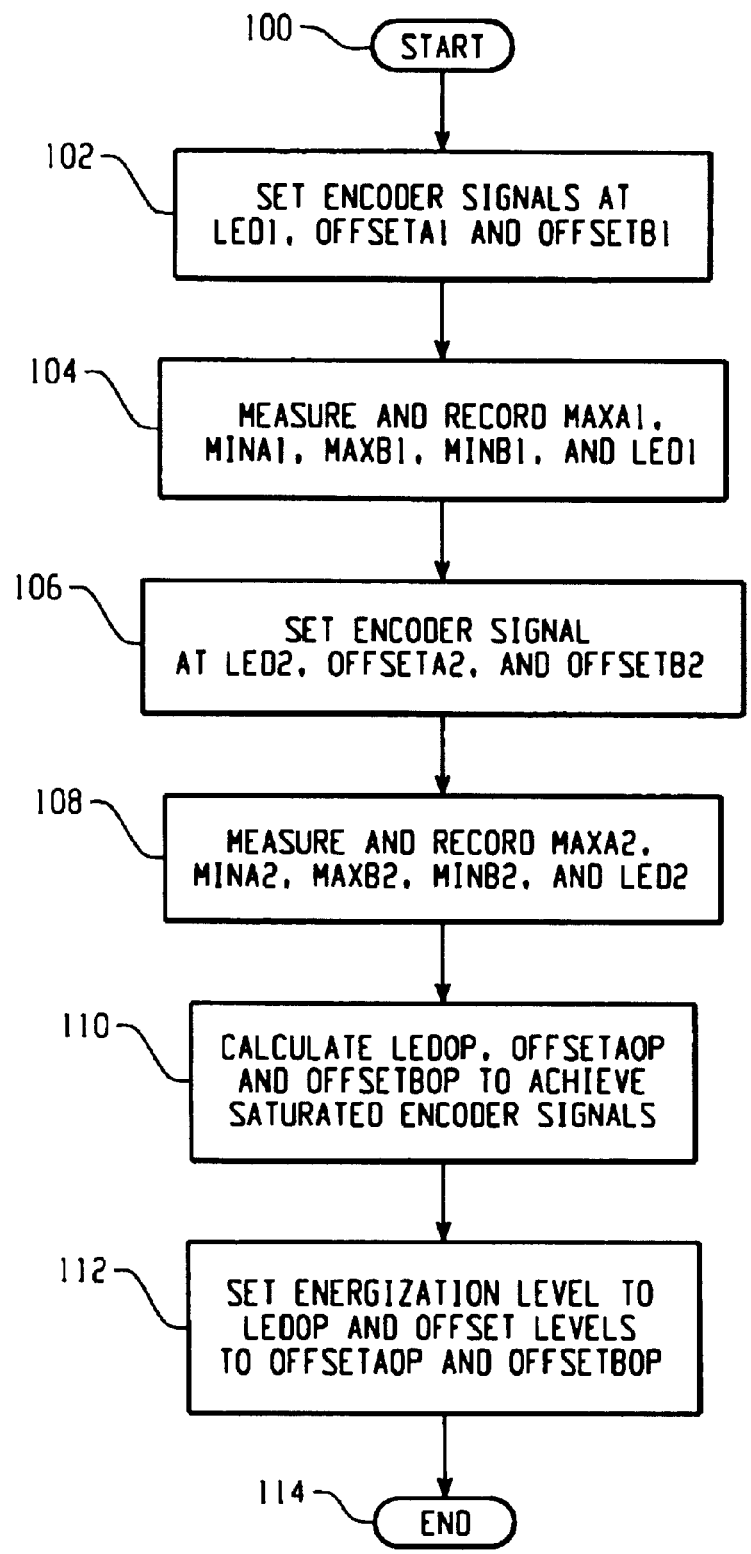
FIG. 2 is a flow chart of one embodiment of an encoder system initialization process.
Figure 3:
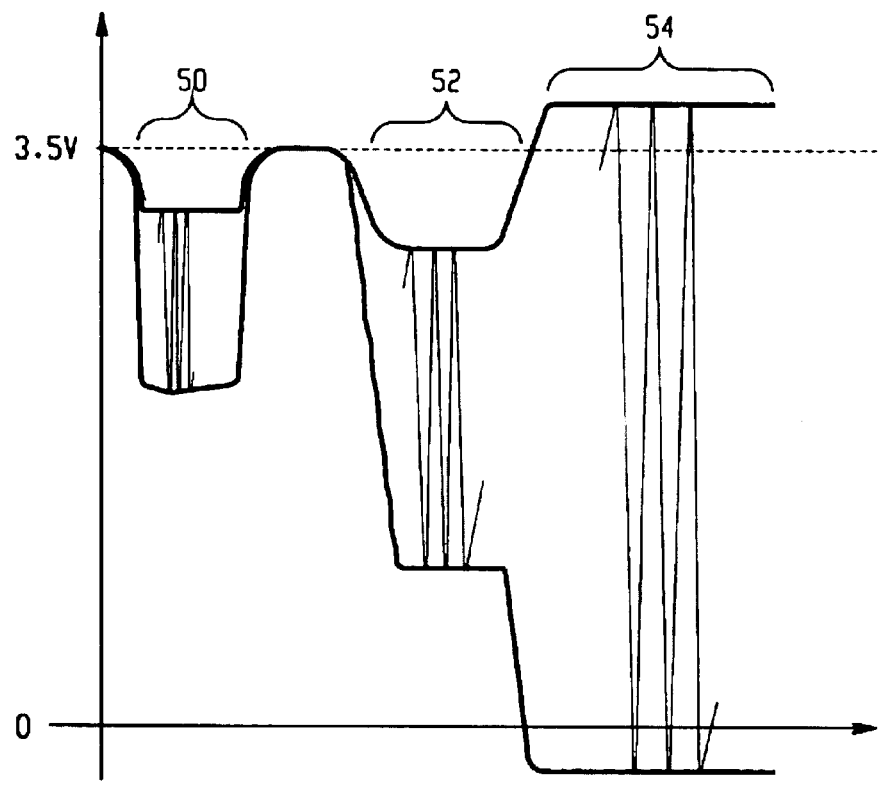
FIG. 3 is a graph depicting one encoder output signal during the process of FIG. 2.

Referring to FIGS. 1–3, one embodiment of an initialization method is described. Upon beginning the initialization procedure at step 100 the initialization module 28 effects energization of the printer structure motor at a MOTOR_PWM known to be sufficient to move the moveable part of the encoder. It is assumed that this setting remains constant throughout the following steps. At step 102 the initialization module 28 sets up the encoder signals for measurement by setting the energization level of the light element 14 at a first energization level corresponding to a duty cycle of LED1 and likewise sets the channel A offset circuitry to a first level corresponding to a duty cycle of OFFSETA1 and the channel B offset circuitry to a first level corresponding to a duty cycle of OFFSETB1. OFFSETA1 and OFFSETB1 may be the same or different. An exemplary upper and lower envelope defining only one of the encoder signals at such settings is shown in region 50 of FIG. 3, with the understanding that the other encoder signal would have a similar, though not necessarily identically positioned and sized, envelope. Portions of an exemplary analog output signal, varying between the upper envelope and lower envelope, are shown at various positions in FIG. 3. Both encoder signals will desirably be entirely within the detection range of the A/D converter. In the illustrated embodiment, the amplitude defined between the upper envelope and lower envelope increases as the energization level of the light element 14 increases. At step 104 the maximum and minimum values of the encoder signals as output by the MIN/MAX detection hardware 26 are recorded as MAXA1, M1NA1, MAXB1 and MINB1 respectively, and the LED1 duty cycle setting is also recorded.

At step 106 the initialization module 28 sets up the encoder signals for a second measurement by setting the energization level of the light element 14 at a second energization level corresponding to a duty cycle of LED2 and likewise sets the channel A offset circuitry to a second level corresponding to a duty cycle of OFFSETA2 and the channel B offset circuitry to a second level corresponding to a duty cycle of OFFSETB2. OFFSETA2 and OFFSETB2 may be the same or different.

In one embodiment corresponding to the exemplary equations set forth below, OFFSETA1=OFFSETA2 and OFFSETB1=OFFSETB2. An exemplary upper and lower envelope defining the one illustrated encoder signal after set up for the second measurement is shown in region 52 of FIG. 3. Again, both encoder signals will desirably be entirely within the detection range of the A/D converter.

At step 108 the maximum and minimum values of the encoder signals as output by the MIN/MAX detection hardware 26 are recorded as MAXA2, MINA2, MAXB2 and MINB2 respectively, and the LED2 duty cycle setting is also recorded. At step 110 the operating energization level for the light element 14 and the operating levels for the offset circuitry of each channel are defined by calculating duty cycle values LEDOP, OFFSETAOP and OFFSETBOP. In one embodiment, corresponding to OFFSETA1=OFFSETA2 and OFFSETB1=OFFSETB2, the calculation produces adjustment values for the energization level of the light element and for the channel A and B offsets according to the following equations:

$$LEDadj = 1 + \frac{(280 - GX2)(LED2 - LED1)}{(GX2 - GX1)} \quad (1)$$

$$OFFSETAadj = \frac{(128 - MidA2)(LED2 - LED1) + (LEDadj)(MidA1 - MidA2)}{6(LED2 - LED1)} \quad (2)$$

$$OFFSETBadj = \frac{(128 - MidB2)(LED2 - LED1) + (LEDadj)(MidB1 - MidB2)}{6(LED2 - LED1)} \quad (3)$$

where, the value 280 in Equation (1) represents the desired peak-to-peak amplitude for the encoder signals during operation, notably 110% of the peak-to-peak amplitude of the detection range of the A/D converter, the value 128 in Equations (2) and (3) represents the desired midpoint for each of the encoder output signals, notably centered in the detection range of the A/D converter;

the value 6 in Equations (2) and (3) is a conversion factor that is set based upon known characteristics of the amplification and offset circuitry;

"GX2" is the smaller of either the channel A signal peak-to-peak amplitude (MAXA2-MINA2) and the channel B signal peak to peak amplitude (MAXB2-MINB2) during the second measurement step;

"GX1" is the peak-to-peak amplitude, either (MAXA1-MINA1) or (MAXB1-MINB1), of the channel signal that defines GX2;

"MidA2" is the midpoint of the channel A signal as determined from MAXA2 and MINA2;

"MidB2" is the midpoint of the channel B signal as determined from MAXB2 and MINB2;

"MidA1" is the midpoint of the channel A signal as determined from MAXA1 and MINA1; and "MidB1" is the midpoint of the channel B signal as determined from MAXB1 and MINB1.

In the illustrated embodiment, all of the values GX1, GX2, MidA1, MidA2, MidB1 and MidB2 will be values between 0 and 255. The operating duty cycle values LEDOP, OFFSETAOP and OFFSETBOP are then calculated as follows:

$$LEDOP = LEDadj + LED2 \quad (4)$$

$$OFFSETAOP = OFFSETAadj + OFFSETA2 \quad (5)$$

$$OFFSETBOP = OFFSETBadj + OFFSETB2 \quad (6)$$

Notably, using the value 280 in Equation (1), and producing signals centered about the detection range, the upper envelope of each signal will be placed above maximum of the detection range by about 5% of the total amplitude of the detection range and the lower envelope of each signal will be placed below the minimum of the detection range by about 5% of such total amplitude. Of course, values other than 280 could be used in connection with Equation (1) to vary the position of the upper and lower signal envelopes.

It is recognized that the foregoing equations are exemplary only, and that other calculation operations could also be implemented to achieve the desired operating settings for the light element 14 and the offset circuitry of each channel of the encoder system. The basic concept is that by measuring a given encoder signal when set at two different known test settings, the measured values can be used to linearly interpolate, or otherwise calculate or define, the necessary operating settings to produce a desired encoder signal that is saturated outside the detection range of an A/D converter or other analog signal detector. Regardless of the calculation operations utilized, as shown for one signal in region 54 of FIG. 3, the result is that the upper envelope of each encoder output signal at a known operating position above the maximum of the A/D converter detection range and the lower envelope of each encoder output signal at a known operating position below the minimum of the A/D converter detection range. Additionally, the operating settings for the offset circuitry of each channel desirably result in the centering of each encoder signal about the A/D converter detection range.

The foregoing initialization procedure may be implemented at various times during the life of a printer. For example, each time the printer is turned on the initialization procedure may be carried out. Alternatively, or in addition to such times, the initialization module or control unit may implement the initialization procedure based upon detection of some ambient printer condition. In one example the printer may include a temperature sensor (not shown) and the ambient printer condition may be a temperature condition, such as one of (i) a detected temperature change of at least a certain amount since last initialization or (ii) a detected temperature exceeding a predetermined temperature.

While the foregoing example of FIGS. 2 and 3 assumes that in both of measuring steps 104 and 108 both analog output signals of the encoder are entirely within the detection range of the A/D converter, it is recognized that in another embodiment the upper and lower envelope of the signals could be outside the detection range during one or more of the measurement steps. In such cases, the initialization module 26 could identify the upper and lower crossover levels of the A and B channel signals (i.e., the level at which the two signals repeatedly cross each other) during each of steps 104 and 108, and utilize those levels when calculating the operating settings for the light element 14 and the offset circuitry.

In certain cases it may be desirable to define and utilize operating settings for the light element 14 and offset circuitry that will place the upper crossover level of the A and B channel signals within the detection range and near the maximum of the detection range and that will place the lower crossover level of the A and B channel signals within the detection range and near the minimum of the detection range.

Figure 5:
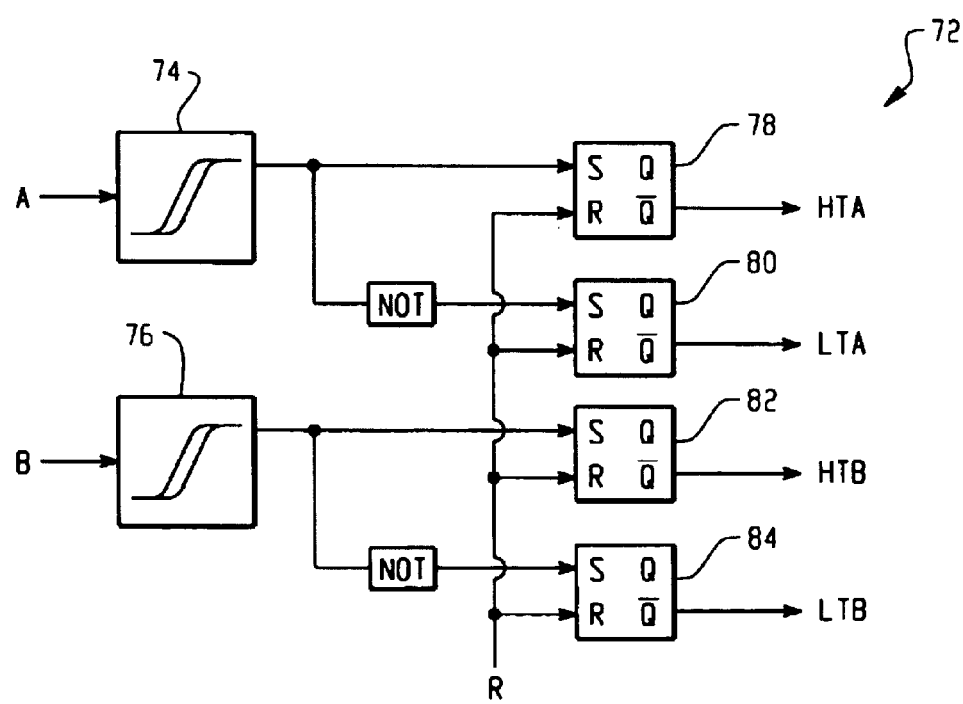
FIG. 5 is a schematic of latching circuitry of the system of FIG. 5.

Turning now to FIGS. 4–7, another encoder system 70 and related initialization procedure will be described. Like components between encoder system 70 and encoder system 10 of FIG. 1 are numbered the same. One notable distinction of encoder system 70 is that, rather than providing the A and B channel encoder output signals to an A/D converter, the signals are provided as inputs to Schmitt Trigger Detection circuitry 72. Accordingly, encoder system 70 does not convert the analog signal levels of the A and B channel encoder signals into corresponding digital values. Instead, the Schmitt trigger detection circuitry 70 defines an upper threshold level and a lower threshold level for each of the encoder signals and outputs signals indicating when those levels are crossed by the respective signals. Referring to one embodiment of the Schmitt Trigger detection circuitry as shown in FIG. 5, an A channel Schmitt Trigger 74 and B channel Schmitt Trigger 76 are provided. Ideally, the Schmitt Triggers 74 and 76 are identical, with similar upper and lower threshold levels. The output of Schmitt Trigger 74 is connected to a latch circuit 78 and, through a NOT gate, to latch circuit 80. Similarly, the output of Schmitt Trigger 76 is connected to a latch circuit 82 and, through a NOT gate, to latch circuit 84. The outputs HTA, LTA, HTB and LTB of the respective latches indicate when the particular thresholds are reached. The latch circuits 78, 80, 82 and 84 can be reset via the illustrated reset line R.

Referring now to the flow chart set forth in FIGS. 6A–6D, an encoder initialization process is described. The process starts at step 200 and at step 202 the initialization module 28 sets the duty cycle of the LED_PWM signal to zero, sets the duty cycle of each of the offset PWM signals to zero and sets the duty cycle of the MOTOR_PWM signal to a value known to produce movement, in this example 20%. After a small delay at step 204, the latching circuits are reset at step 206. Then, per steps 208, 210, 212, 214, 216, 218 and 220, the duty cycles, OffsetA and OffsetB, of both offset PWM signals are increased until both the A channel encoder signal and the B channel encoder signal reach the upper threshold level of their respective Schmitt Triggers as indicated by HTA and HTB going high. This process is shown for a single encoder channel in region 80 of the graph of FIG. 7. Notably, because the light element is not energized during theses steps, the encoder signal appears as a solid line, rather than having an upper and lower envelope. The offset duty cycles corresponding to the upper threshold level for each channel are then recorded as OffzHlA and OffzHB respectively at step 222.

Figure 7:
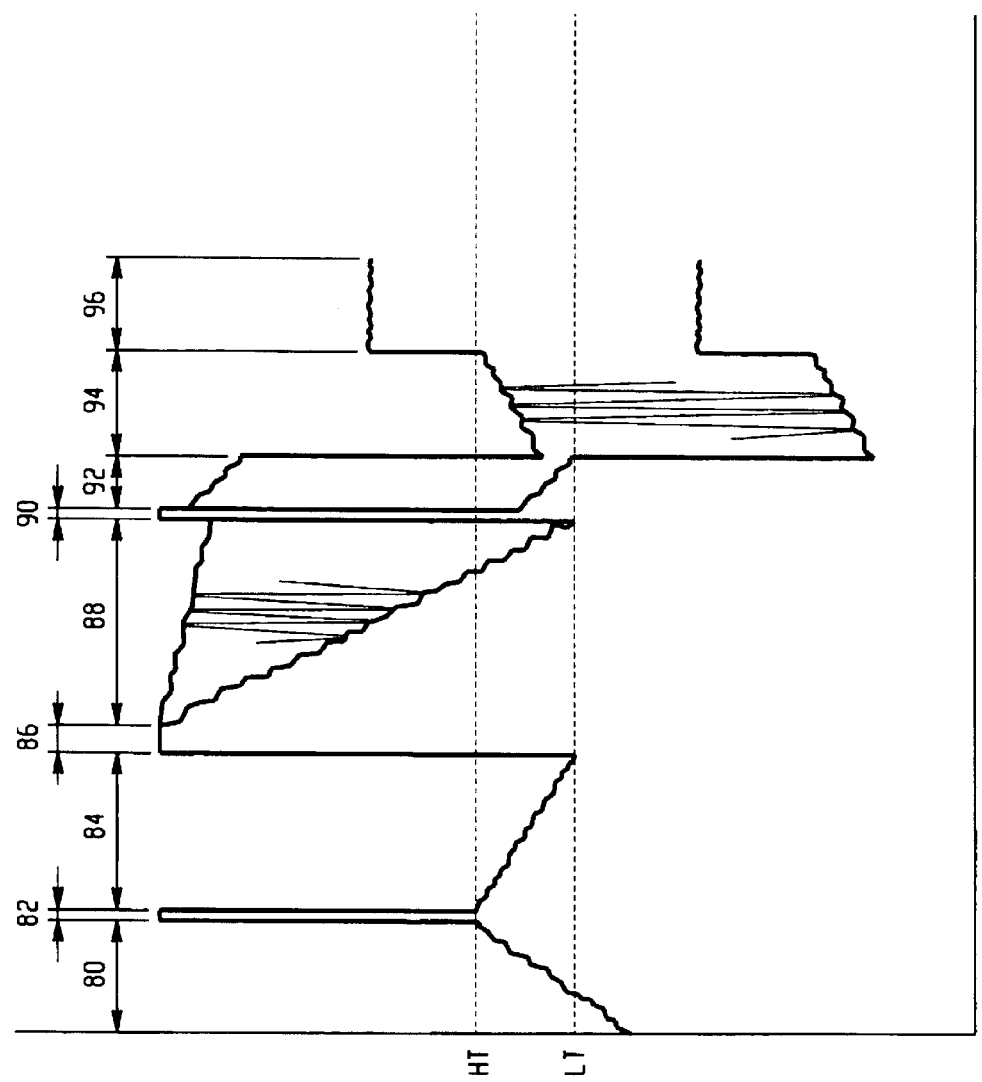
FIG. 7 is a graph depicting one encoder output signal during the process of FIGS. 6A–6D.

Next, in steps 224, 226 and 228 the duty cycles, OffsetA and OffsetB, of the offset PWM signal of both channels are set to 100% momentarily and the latching circuits associated with the Schmitt Triggers are reset, which is shown graphically for a single signal in region 82 of FIG. 7. At step 230 the offset duty cycles are set back to the OffzHA and OffzHB values. In steps 232, 234, 236, 238, 240, 242 and 244, the duty cycles, OffsetA and OffsetB, of the offset PWM signals of the two channels are decreased until both the A channel encoder signal and the B channel encoder signal reach the lower threshold level of their respective Schmitt Triggers as indicated by LTA and LTB going high. This process is shown for a single signal in region 84 of FIG. 7. At step 246 the duty cycles corresponding to the lower threshold level for each channel are then recorded as OffzLA and OffzLB. In steps 248, 250 and 252 the duty cycles, OffsetA and OffsetB, of both channels are set to 100% and the latching circuits associated with the Schmitt Triggers are reset, which is shown graphically for a single signal in region 86 of FIG. 7.

In steps 254, 256 and 258 the duty cycle LED of the LED_PWM signal is then incrementally increased until the lower envelope of the A channel encoder signal or the lower envelope of the B channel encoder signal reaches the lower threshold level of the respective Schmitt Trigger as indicated by LTA or LTB going high, and shown graphically for a single signal in region 88 of FIG. 7. At step 260 the duty cycle just below that which caused a lower threshold to be reached is recorded as LEDE, and in steps 262, 264 and 266 the latching circuits associated with the Schmitt Triggers are reset while the duty cycle of the LED_PWM signal is zero, which is illustrated in region 90 of FIG. 7. At step 268 the duty cycle LED of the LED_PWM signal is reset to the LEDE value and then in steps 270, 272, 274, 276, 278, 280 and 282 of FIG. 6B the duty cycles, OffsetA and OffsetB, of both offset PWM signals are repeatedly decreased until the lower envelope of each of the A channel encoder signal and the B channel encoder signal reaches the lower threshold level of the respective Schmitt Triggers as indicated by LTA and LTB going high, which is shown graphically for a single signal in region 92 of FIG. 7. At step 284, the offset duty cycles corresponding to the lower threshold for each channel are recorded as OffLTA and OffLTB.

In step 286 the duty cycles for the offset PWM signals are set low, back to the OffzHA and OffzHB values, and the latching circuits are reset per steps 288 and 290. In steps 292, 294, 296, 298, 300, 302 and 304 the duty cycles of both offset PWM signals are repeatedly increased until the upper envelope of each of the A channel encoder signal and the B channel encoder signal reaches the upper threshold level of the respective Schmitt Trigger as indicated by HTA and HTB going high, which is shown graphically for a single signal in region 94 of FIG. 7. The offset duty cycles corresponding to the upper threshold level for each channel are then recorded as OffHTA and OffHTB respectively at step 306.

In step 308, the peak to peak amplitude (GA) of the A channel encoder signal and the peak to peak amplitude (GB) of the B channel encoder signal are calculated per the exemplary equations. Referring to the equation for GA, the value (OffzHA-OffzLA) represents the range between the Schmitt trigger's upper and lower thresholds, the value (OffLTA-OffHTA) is the difference between the duty cycle of the OffsetA_PWM signal that trips the lower threshold and the duty cycle of the OffsetA_PWM signal that trips the upper threshold, and the number 6 is a known conversion factor particular to the characteristics of the amplifier and offset correction circuitry, and therefore could vary depending upon the characteristics of such circuitry in any given system. Thus, the exemplary equations find the peak to peak amplitude of the encoder signals by summing the portion of each of the encoder signals that is beyond the Schmitt trigger hysteresis range with the hysteresis range. In step 310 the duty cycle, OffsetA and OffsetB, of each of the offset PWM signals is set to a value that centers its respective encoder signal about the upper and lower threshold levels, which is shown graphically in region 96 of FIG. 7.

In steps 312, 314 and 316 if the peak to peak amplitude of either of the channels is below a certain value, in this example 320, which is 125% of 256 (the size of the detection range of the A/D converter in the prior embodiment), an adjustment value LEDadj for the duty cycle of the LED_PWM signal needed to bring the amplitude up to the certain value is calculated per the illustrated equation. At step 318 the duty cycles, OffsetA and OffsetB, of the offset PWM signals are both adjusted per the illustrated equation to again achieve centering and at step 320 the value LEDadj is added to duty cycle LED of the LED_PWM signal. The initialization procedure ends with steps 322 and 324.

The foregoing initialization procedure results in a method for initializing an analog output signal of an encoder system, without converting analog signal level to corresponding digital values, involving the steps of (a) inputting the analog output signal to an upper level detector that detects when the analog output signal increases to an upper threshold level; (b) repeatedly adjusting the setting of the dc offset circuitry to increase the offset of the analog output signal until the level detector outputs an indicator that the upper threshold level is reached; (c) recording the setting of the dc offset circuitry corresponding to the output of the indicator of step (b); (d) inputting the analog output signal to a lower level detector that detects when the analog output signal decreases to a lower threshold level; (e) repeatedly adjusting the setting of the dc offset circuitry to decrease the offset of the analog output signal until the lower level detector outputs an indicator that the lower threshold level is reached; (f) recording the setting of the dc offset circuitry corresponding to output of the indicator of step (e); (g) placing the setting of the dc offset circuitry at a level to produce a high dc offset and repeatedly adjusting the energization level of the light element to increase an envelope of the analog output signal until the lower level detector outputs an indicator that the lower threshold level is reached; (h) subsequent to step (g), adjusting the energization level of the light element to place the envelope of the analog output signal above the lower threshold level and: (i) adjusting the setting of the dc offset circuitry to decrease the offset of the envelope until the level detector outputs an indicator that the lower threshold level is reached, (ii) recording the setting of the dc offset circuitry corresponding to output of the indicator of (h)(i); (i) subsequent to step (h), placing the setting of the dc offset circuitry at a level to produce a low dc offset and: (i) adjusting the setting of the dc offset circuitry to increase the offset of the envelope until the upper level detector outputs an indicator that the upper threshold level is reached, (ii) recording the setting of the dc offset circuitry corresponding to output of the indicator of (i)(i).

Figure 4:
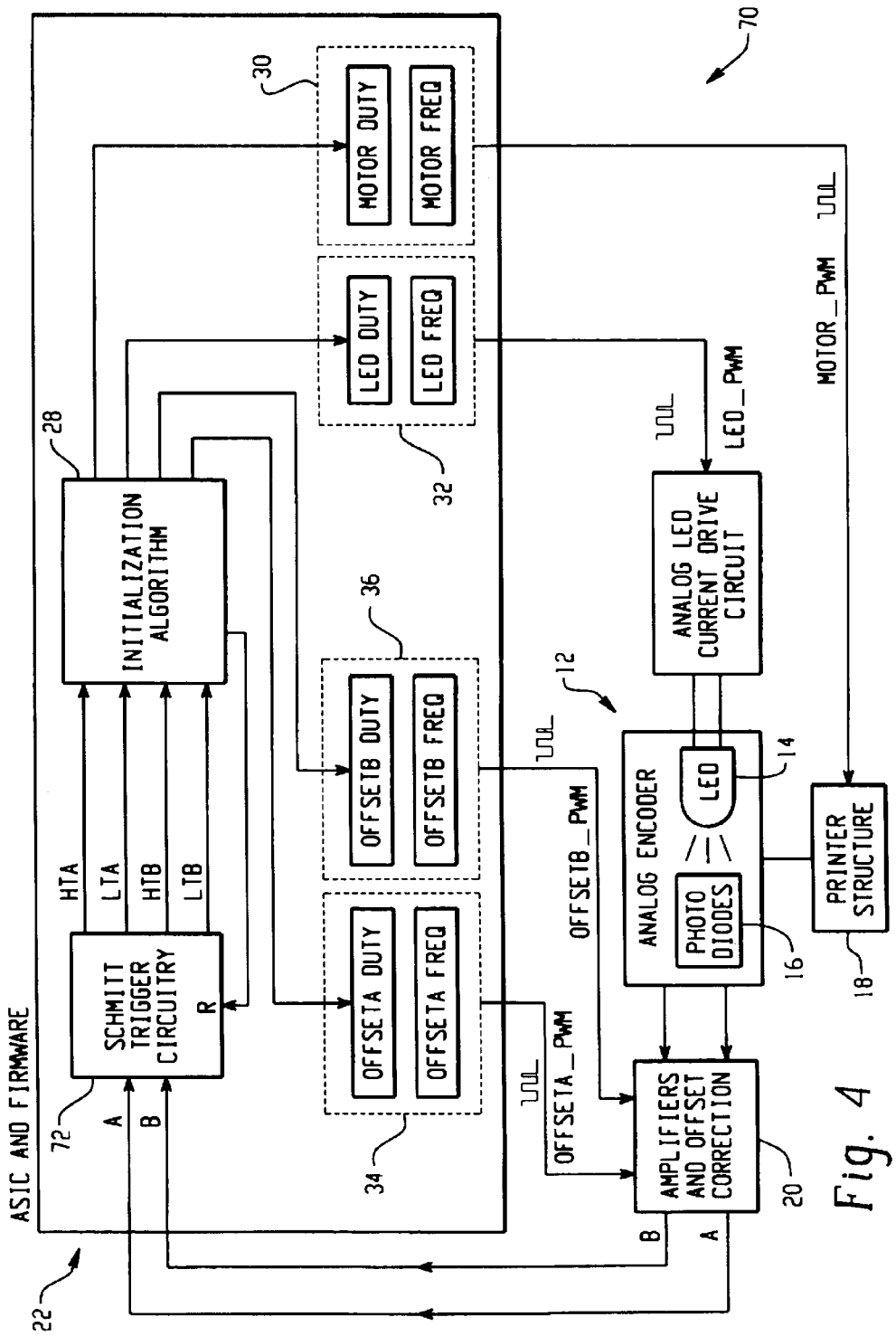
FIG. 4 is a schematic of another embodiment of an encoder system of a printer.
Figure 6A:
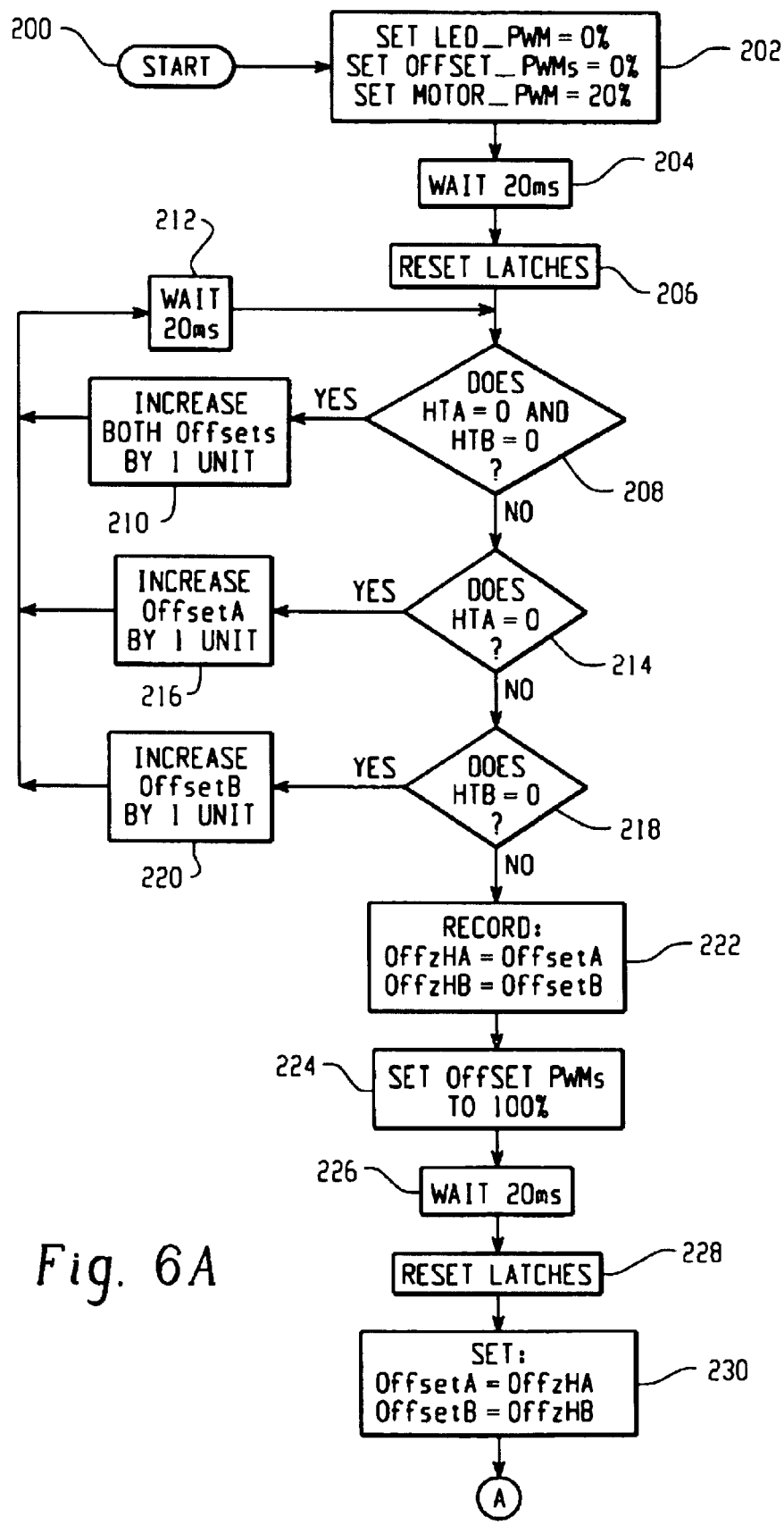
FIGS. 6A, 6B, 6C and 6D depict a flow chart of another embodiment of an encoder initialization process.
Figure 6B:
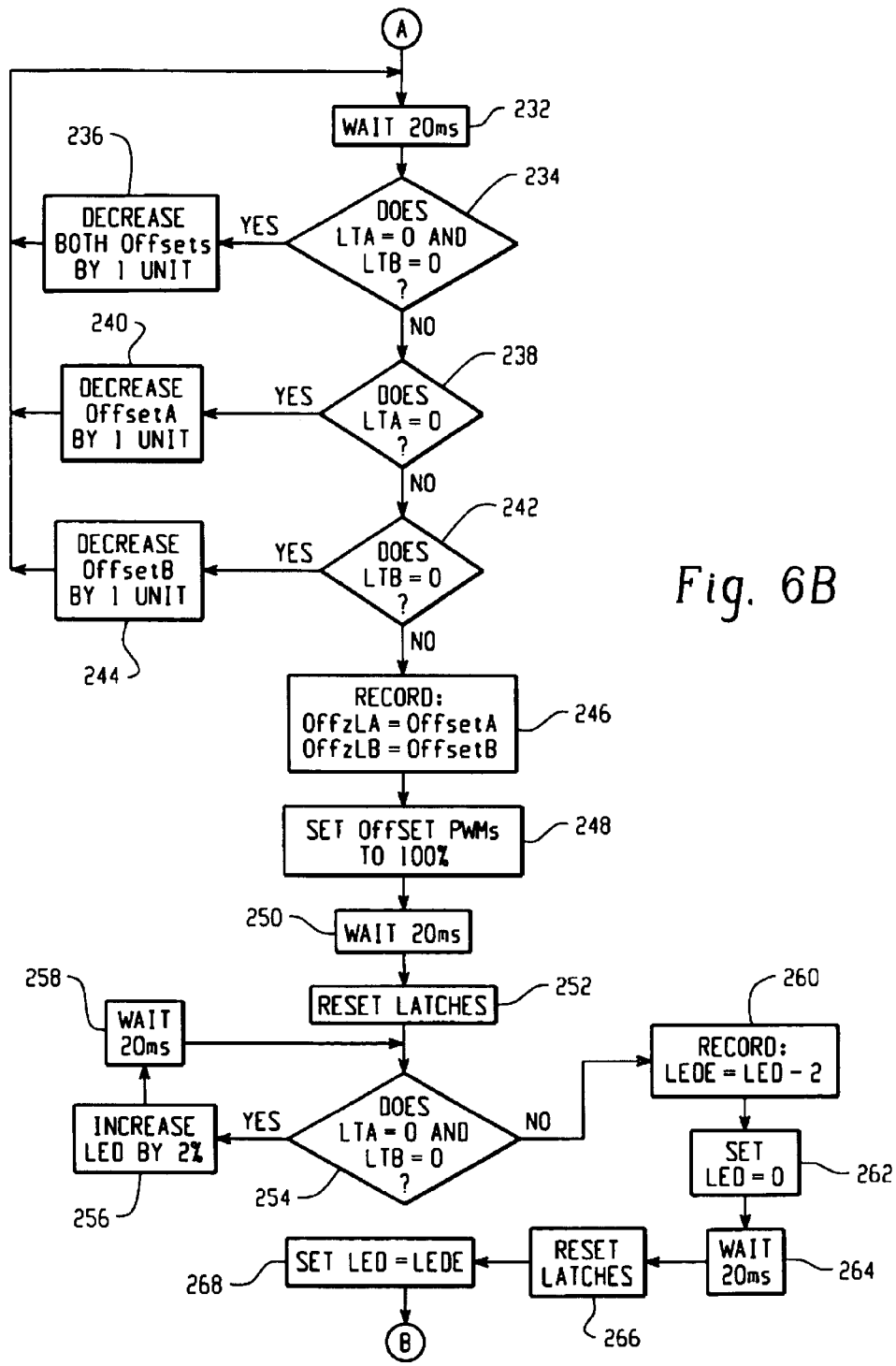
Figure 6C:
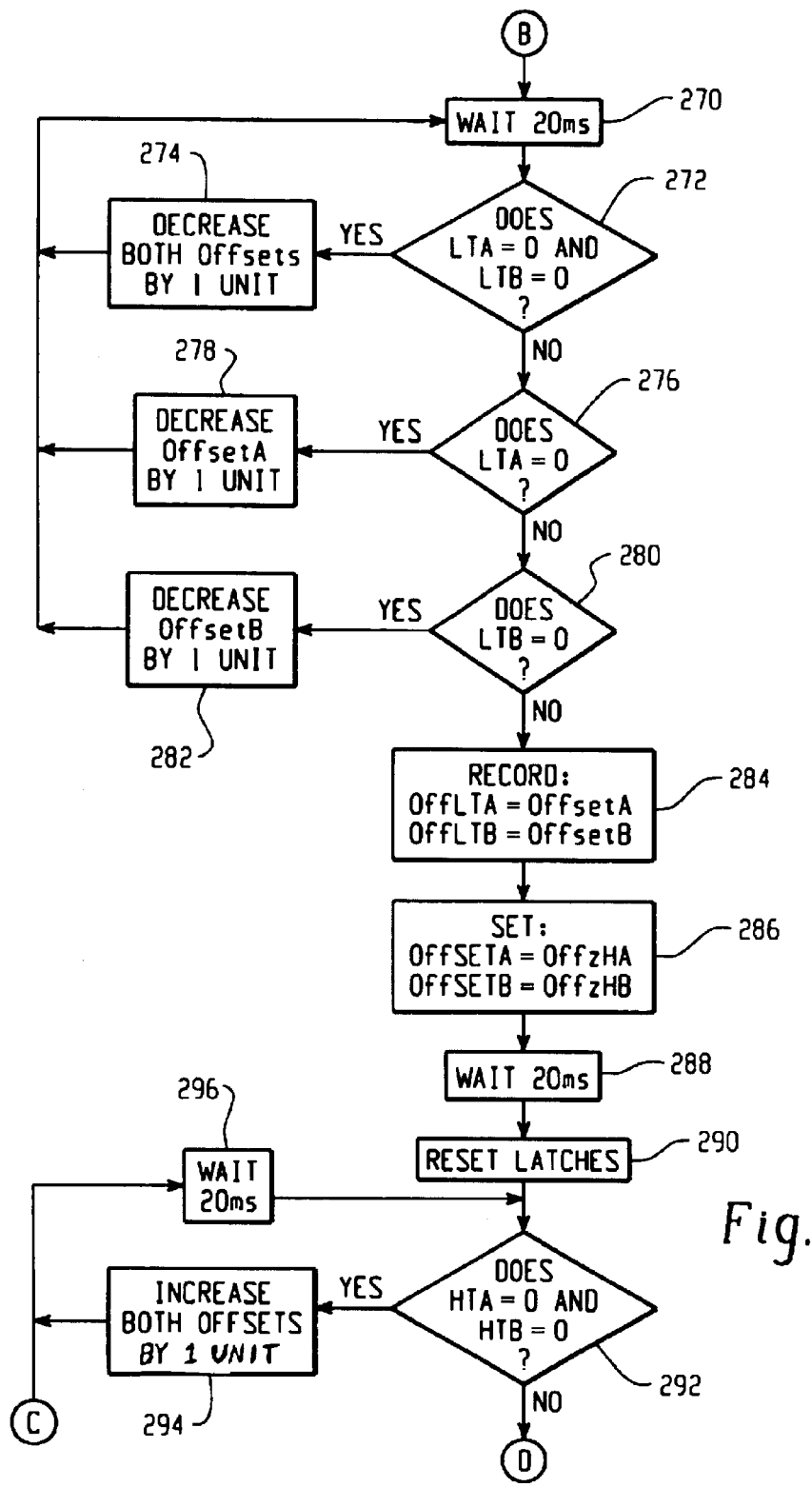
Figure 6D:
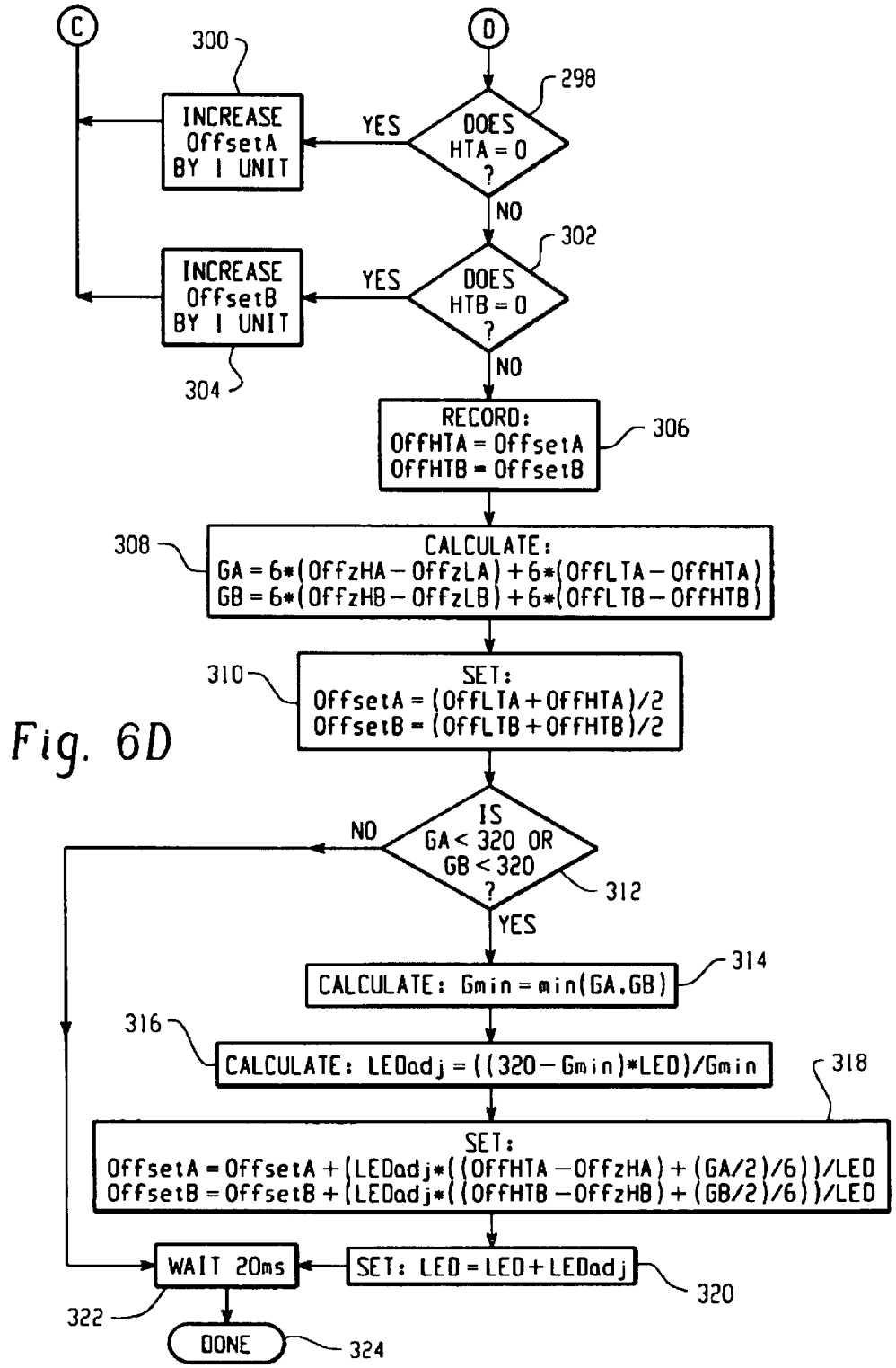

In an alternative initialization procedure useful in connection with the encoder system of FIG. 4, the duty cycle of the LED_PWM signal and the duty cycles of both offset PWM signals are all set to zero and the duty cycle of the MOTOR_PWM signal is set to a non-zero value sufficient to produce movement of the printer structure 18. The separation between the upper and lower Schmitt Trigger thresholds is then determined by increasing and decreasing the duty cycles of the offset PWM signals and monitoring the outputs of the Schmitt triggers. Next, the duty cycle of the LED_PWM signal is increased to grow the encoder signal peak to peak amplitudes to a first level, and then the actual peak to peak amplitudes values are estimated by increasing and decreasing the duty cycles of the offset PWM signals and monitoring changes in the Schmitt Trigger outputs. Next, the LED_PWM is adjusted to set the encoder signal peak to peak amplitudes at a second level, and then the actual peak to peak amplitudes are estimated by increasing and decreasing the duty cycles of the offset PWM signals and monitoring changes in the Schmitt Trigger outputs. The measurements/estimations are then used to determine the needed operating duty cycles for the LED_PWM signal and the offset PWM signals to give desired encoder output signals.

While FIG. 4 and the related initialization procedures described above contemplate the use of Schmitt Triggers, it is recognized that other types of analog signal level detectors that do not convert analog levels to digital values could also be used. The foregoing initialization procedures associated with FIG. 4 could be implemented at various times such as power up and/or based upon detection of an ambient printer condition as previously described.

Although the invention has been described above in detail referencing the illustrated embodiment thereof, it is recognized that various changes and modifications could be made.

What is claimed is:

1. A method for initializing an encoder system that provides a varying analog output signal to an analog signal detector having a detection range defined by a maximum and a minimum, the encoder system including at least one component that can be controlled to vary at least a peak to peak amplitude of the analog output signal, the method comprising the steps of:

(a) measuring an output of the analog signal detector while the component is at a first setting;

(b) measuring the output of the analog signal detector while the component is at a second setting;

(c) based at least in part upon measurements made in steps (a) and (b), defining an operating setting for the component so as to place an upper envelope of the analog output signal above the maximum of the detection range and a lower envelope of the analog output signal below the minimum of the detection range when the encoder system operates with the component at the operating setting.

2. The method of claim 1 wherein the operating setting is defined to place the upper envelope higher than the maximum of the detection range by at least a certain amount and the lower envelope below the minimum of the detection range by at least the certain amount.

3. The method of claim 2 wherein the certain amount is about five percent of the amplitude defined by the maximum minus the minimum.

4. The method of claim 1 wherein the encoder provides first and second analog output signals, and steps (a), (b) and (c) are carried out for each of the first and second analog output signals.

5. The method of claim 4 wherein the at least one component comprises a light element, a first offset component to vary a mid-point of the first analog output signal and a second offset component to vary a mid-point of the second analog output signal, further comprising the step of centering both the first and second analog output signals about the detection range.

6. The method of claim 4 wherein the operating setting is defined to place an upper crossover of the first and second analog output signals within the detection range and place a lower crossover of the first and second analog encoder output signals within the detection range.

7. The method of claim 6 wherein the upper crossover is placed near the maximum of the detection range and the lower crossover is placed near the minimum of the detection range.

8. The method of claim 1 wherein the at least one component comprises both a light element with an adjustable energization level and DC offset circuitry associated with a photo sensor, wherein:

step (a) is performed while the light element is energized at a first energization level and the DC offset circuitry is set at a first offset level;

step (b) is performed while the light element is energized at a second energization level and the DC offset circuitry is set at a second offset level;

step (c) involves performing a calculation to define an operating energization level for the light element and an operating offset level for the DC offset circuitry, where the operating offset level is further defined to center the analog output signal about the detection range.

9. The method of claim 8 wherein the first offset level and the second offset level are the same.

10. The method of claim 1 wherein the analog signal detector comprises an analog to digital converter.

11. The method of claim 1 wherein in step (a) the component first setting maintains the entire analog output signal within the detection range of the analog signal detector and the maximum amplitude and minimum amplitude of the analog output signal are measured, and in step (b) the component second setting also maintains the entire analog output signal within the detection range and the maximum amplitude and minimum amplitude of the analog output signal are measured.

12. A printer, carrying out the method of claim 1, the printer including a control unit connected to receive the output of the analog signal detector, the control unit having an output connected to control the setting of the component, the encoder connected to track movement of one of a print head carriage and a paper feed path roller, wherein the control unit effects the steps of claim 1.

13. A method for initializing an encoder system that includes a movable element and produces at least first and second varying analog output signals in response to movement of the movable element, the encoder system including at least one output affecting component that can be adjusted, the method comprising the steps of:

(a) inputting the first and second analog output signals to an analog to digital converter having a detection range defined by a maximum and a minimum;

(b) for each of the first and second analog output signals, measuring a corresponding output of the analog to digital converter while the movable encoder element is moving and the output affecting component is set at at least one known setting;

(c) based at least in part upon the measuring done in step (b), defining an operating setting for the output affecting component so as to place an upper envelope of each of the first and second analog output signals above the maximum of the detection range and the lower envelope of each of the first and second analog output signals below the minimum of the detection range.

14. The method of claim 13 wherein the at least one output affecting component comprises a light element, dc offset circuitry associated with the first analog output signal and dc offset circuitry associated with the second analog output signal.

15. The method of claim 14 wherein in step (c) an operating energization level of the light element is defined.

16. The method of claim 15 wherein in step (c) an operating offset setting for the dc offset circuitry associated with both of the first and second analog output signals is defined so as to center both of the first and second analog output signals about the detection range.

17. The method of claim 13 wherein step (b) is performed for at least first and second known settings of the output affecting component.

18. The method of claim 17 wherein both the first and second known settings maintain both the first and second analog output signals entirely within the detection range.

19. The method of claim 17 wherein the first and second known settings maintain both an upper crossover and a lower crossover of the first and second analog output signals within the detection range, and step (c) involves using determined signal crossover levels of the analog output signals at both the first and second known settings to define the operating settings.

20. A printer, comprising:

an encoder system for providing a varying analog output signal in response to movement of a moveable part of the printer, the encoder system including at least one component that can be controlled to vary at least a peak to peak amplitude of the analog output signal;

an analog signal detector having a set detection range defined by a maximum and a minimum, the analog signal detector receiving the analog output signal;

a control unit connected to control movement of the moveable part of the printer and to control a setting of the component, the control unit receiving a digital output of the analog signal detector, the control unit having at least an encoder initialization mode in which it effects the following steps:
  (a) measuring an output of the analog signal detector while the component is at a first setting and the moveable part of the printer is moving;
  (b) measuring the output of the analog signal detector while the component is at a second setting and the moveable part of the printer is moving;
  (c) based at least in part upon measurements made in steps (a) and (b), defining an operating setting for the component so as to place an upper envelope of the analog output signal above the maximum of the detection range and a lower envelope of the analog output signal below the minimum of the detection range when the encoder operates with the encoder component at the operating setting.

21. The printer of claim 20 wherein the encoder provides first and second analog output signals to the analog signal detector, and the control unit effects steps (a), (b) and (c) for each of the first and second analog output signals.

22. The printer of claim 21 wherein the at least one component comprises a light element with an adjustable energization level and a photo sensor and DC offset circuitry combination for each analog output signal, and in step (c) the control unit defines an operating energization level for the photo sensor and also defines operating settings of the DC offset circuitry so as to center both the first and second analog output signals about the detection range.

23. The printer of claim 20 wherein in step (a) the component first setting maintains the entire analog output signal within the detection range of the analog signal detector and the maximum amplitude and minimum amplitude of the analog output signal are measured, and in step (b) the component second setting also maintains the analog output signal within the detection range and the maximum amplitude and minimum amplitude of the analog output signal are measured.

24. The printer of claim 20 wherein the control unit initiates the initialization mode steps in response to detection of an ambient printer condition.

25. The printer of claim 24 wherein the ambient printer condition is a temperature condition.

26. The printer of claim 25 wherein the temperature condition is one of (i) a detected temperature change of at least a certain amount since last initialization or (ii) a detected temperature exceeding a predetermined temperature.

27. A method for initializing an encoder system that produces an analog output signal on an output channel, without converting analog signal levels of the analog output signal into corresponding digital values, the system including a light element with an adjustable energization level and the output channel including a photo sensor producing a signal as a function of light received and dc offset circuitry for offsetting the signal to produce the analog output signal, the method comprising the steps of:
  (a) inputting the analog output signal to an upper level detector that detects when the analog output signal increases to an upper threshold level;
  (b) repeatedly adjusting the setting of the dc offset circuitry to increase the offset of the analog output signal until the level detector outputs an indicator that the upper threshold level is reached;
  (c) recording the setting of the dc offset circuitry corresponding to output of the indicator of step (b);
  (d) inputting the analog output signal to a lower level detector that detects when the analog output signal decreases to a lower threshold level;
  (e) repeatedly adjusting the setting of the dc offset circuitry to decrease the offset of the analog output signal until the lower level detector outputs an indicator that the lower threshold level is reached;
  (f) recording the setting of the dc offset circuitry corresponding to output of the indicator of step (e);
  (g) placing the setting of the dc offset circuitry at a level to produce a high dc offset and repeatedly adjusting the energization level of the light element to increase an envelope of the analog output signal until the lower level detector outputs an indicator that the lower threshold level is reached;
  (h) subsequent to step (g), adjusting the energization level of the light element to place the envelope of the analog output signal above the lower threshold level and:
    (i) adjusting the setting of the dc offset circuitry to decrease the offset of the envelope until the level detector outputs an indicator that the lower threshold level is reached;
    (ii) recording the setting of the dc offset circuitry corresponding to output of the indicator of (h)(i);
  (i) subsequent to step (h), placing the setting of the dc offset circuitry at a level to produce a low dc offset and:
    (i) adjusting the setting of the dc offset circuitry to increase the offset of the envelope until the upper level detector outputs an indicator that the upper threshold level is reached;
    (ii) recording the setting of the dc offset circuitry corresponding to output of the indicator of (i)(i).

28. The method of claim 27, further comprising:
  (j) based at least in part upon the recorded values of steps (c), (f), (h)(ii) and (i)(ii), calculating an amplitude of the envelope of the analog output signal.

29. The method of claim 28, further comprising:
  (k) based at least in part upon the recorded values of steps (h)(ii) and (i)(ii), calculating an operating setting of the dc offset circuitry that will center the envelope of the analog output signal about the upper threshold level and the lower threshold level.

30. The method of claim 29, further comprising:
  (l) calculating a peak to peak amplitude of the analog output signal;
  (m) if the peak to peak amplitude of the analog output signal is below a set threshold, calculating an adjustment energization level for the light element to increase the peak to peak amplitude of the analog output signal to at least the set threshold.

31. The method of claim 30, further comprising:
  (n) subsequent to step (m), calculating an adjusted operating setting for the dc offset circuitry to re-center the envelope of the analog output signal about the upper threshold level and the lower threshold level.

32. The method of claim 27 wherein the encoder system includes a moveable element that varies light received by the photo sensor as the moveable element moves, wherein during all of steps (a) through (i) the moveable element is moved at a substantially constant rate.

33. The method of claim 27 wherein the upper level detector and lower level detector are formed together as a Schmitt trigger device.

34. The method of claim 33 wherein the Schmitt trigger includes latching circuitry at its output side.

35. A printer including the encoder system of claim 27 and carrying out the initialization method of claim 27.

36. A method for initializing an encoder system that produces an analog output signal on an output channel, without converting analog signal levels of the analog output signal into corresponding digital values, the system including a light element with an adjustable energization level and the output channel including a photo sensor producing a signal as a function of light received and dc offset circuitry for offsetting the signal to produce the analog output signal, the method comprising the steps of:

(a) inputting the analog output signal to at least one level detector that detects when the analog output signal increases to an upper threshold level and when the analog output signal decreases to a lower threshold level;

(b) while the energization level of the light element is set at a first energization level, adjusting the setting of the dc offset circuitry and monitoring for changes in output of the level detector to identify a first offset setting corresponding to the upper threshold level and a second offset setting corresponding to the lower threshold setting;

(c) while the energization level of the light element is set at a second energization level, adjusting the setting of the dc offset circuitry and monitoring for changes in output of the level detector to identify a third offset setting corresponding to the upper threshold level and a fourth offset setting corresponding to the lower threshold setting;

(d) based at least in part upon the first, second, third and fourth offset settings identified in steps (b) and (c), establishing an operating energization level for the light element and an operating offset setting for the dc offset circuitry.

37. The method of claim 36 wherein the first energization level is substantially zero and wherein the second energization level is non-zero.

38. The method of claim 36 wherein the encoder system includes a moveable element that varies light received by the photo sensor as the moveable element moves, wherein during steps (b) and (c) the moveable element is moved at a substantially constant rate.

39. The method of claim 36 wherein the at least one level detector comprises a Schmitt trigger.

40. The method of claim 39 wherein the Schmitt trigger includes latching circuitry at its output side.

41. The method of claim 36 wherein the at least one level detector comprises a first level detector for the upper threshold level and a second level detector for the lower threshold level.

42. A printer including the encoder system of claim 36 and carrying out the initialization method of claim 36.

43. A method for initializing an encoder system that produces an analog output signal on an output channel, without converting analog signal levels of the analog output signal into corresponding digital values, the system including a light element with an adjustable energization level and the output channel including a photo sensor producing a signal as a function of light received and dc offset circuitry for offsetting the signal to produce the analog output signal, the method comprising the steps of:

(a) inputting the analog output signal to at least one level detector that detects when the analog output signal increases to an upper threshold level and detects when the analog output signal decreases to a lower threshold level;

(b) adjusting the setting of the dc offset circuitry and monitoring for changes in output of the level detector to identify offset settings corresponding to the upper threshold level and the lower threshold level;

(c) based at least in part upon the offset settings identified in step (b), establishing an operating energization level for the light element and an operating offset setting for the dc offset circuitry.

44. The method of claim 43 wherein the at least one level detector comprise a Schmitt trigger.

45. The method of claim 44 wherein the Schmitt trigger includes latching circuitry at its output side.

46. The method of claim 45 wherein step (b) involves at least:

(1) while the energization level of the light element is set at a first energization level, adjusting the setting of the dc offset circuitry and monitoring for changes in output of the Schmitt trigger to identify offset settings corresponding to the upper threshold level and the lower threshold level; and (2) while the energization level of the light element is set at a second energization level, adjusting the setting of the dc offset circuitry and monitoring for changes in output of the Schmitt trigger to identify offset settings corresponding to the upper threshold level and the lower threshold level.

47. The method of claim 43 wherein the operating energization level for the light element and the operating offset setting for the dc offset circuitry are established to center the analog output signal about the range defined by the upper threshold level and the lower threshold level, and to place an upper envelope of the analog output signal above the upper threshold level and a lower envelope of the analog output signal below the lower threshold level.

48. The method of claim 43, wherein the encoder system produces a first analog output signal on a first output channel and a second analog output signal on a second output channel, and each output channel includes a corresponding photo sensor and corresponding dc offset circuitry, wherein steps (a), (b) and (c) are performed for both the first analog output signal and the second analog output signal.

49. In a printer including an encoder system with a movable element connected for movement with a printer structure, the encoder system including at least one light element and at least first and second output channels, the first output channel producing an analog output signal that varies according to light received by a first photo sensor and the second output channel producing an analog output signal that varies as a function of light received by a second photo sensor, wherein movement of the movable element varies light received by the first and second photo sensors, a signal detection system comprising:

a first Schmitt trigger connected to receive the analog output signal of the first output channel and having a first upper detection threshold and a first lower detection threshold, first latching circuitry connected to an output of the first Schmitt trigger for producing (i) a latched output corresponding to the analog output signal of the first output channel reaching the first upper detection threshold and (ii) a latched output corresponding to the analog output signal of the first output channel reaching the first lower detection threshold; and a second Schmitt trigger connected to receive the analog output signal of the second output channel and having a second upper detection threshold and a second lower detection threshold, second latching circuitry connected to an output of the second Schmitt trigger for producing (i) a latched output corresponding to the analog output signal of the second output channel reaching the second upper detection threshold and (ii) a latched output corresponding to the analog output signal of the second output channel reaching the second lower detection threshold.

50. The printer of claim 49 wherein the first upper detection threshold and the second upper detection threshold are substantially the same, and the first lower detection threshold and the second lower detection threshold are substantially the same.

51. The printer of claim 50 wherein the latched outputs of the first latching circuitry and the second latching circuitry are provided as inputs to a control unit that is operable to initialize the encoder system.

52. The printer of claim 51 wherein the control unit is connected to reset the first latching circuitry and second latching circuitry.

53. In a printer including one of a print head carriage and a paper feed roller connected with an encoder system that produces a varying analog output signal corresponding to movement of the one of the carriage and roller, the encoder system including at least one component that can be controlled to vary the analog output signal and a control unit operable to initialize the encoder system to achieve a suitable encoder output signal for use in monitoring movement of the one of the carriage and the roller, a method of triggering an initialization process, comprising the steps of:

detecting an ambient temperature condition of the printer, and triggering the initialization process if the ambient temperature condition satisfies a certain parameter.

54. The method of claim 53 wherein the certain parameter comprises one of (i) a detected temperature change of at least a certain amount since last initialization or (ii) a detected temperature exceeding a predetermined temperature.

* * * * *